United States Patent
Erhart

(10) Patent No.: US 10,311,181 B2
(45) Date of Patent: Jun. 4, 2019

(54) METHODS AND SYSTEMS FOR CREATING COMPUTERIZED MESH MODEL FOR LAYERED SHELL-LIKE STRUCTURE

(71) Applicant: Livermore Software Technology Corporation, Livermore, CA (US)

(72) Inventor: Tobias Erhart, Stuttgart (DE)

(73) Assignee: Livermore Software Technology Corp., Livermore, CA (US)

( * ) Notice: Subject to any disclaimer, the term of this patent is extended or adjusted under 35 U.S.C. 154(b) by 674 days.

(21) Appl. No.: 14/714,327

(22) Filed: May 17, 2015

(65) Prior Publication Data

US 2016/0328492 A1    Nov. 10, 2016

Related U.S. Application Data

(60) Provisional application No. 62/159,248, filed on May 9, 2015.

(51) Int. Cl.
     G06F 17/10      (2006.01)
     G06F 17/50      (2006.01)
     G06T 17/00      (2006.01)

(52) U.S. Cl.
     CPC .......... *G06F 17/5018* (2013.01); *G06T 17/00* (2013.01); *G06F 2217/44* (2013.01)

(58) Field of Classification Search
None
See application file for complete search history.

(56) References Cited

U.S. PATENT DOCUMENTS

| | | | | |
|---|---|---|---|---|
| 6,573,892 B1 * | 6/2003 | Yang | ...................... | G06T 17/20 345/421 |
| 8,600,708 B1 * | 12/2013 | Mallet | ..................... | G06T 17/05 703/2 |

(Continued)

OTHER PUBLICATIONS

Quadros et al. Hex-Layer: Layered All-Hex Mesh Generation on thin Section Solids Via Cordal Surface Transformation IMR Sep. 2002.*

(Continued)

*Primary Examiner* — Aniss Chad
*Assistant Examiner* — Cuong V Luu
(74) *Attorney, Agent, or Firm* — Roger H. Chu

(57) ABSTRACT

Methods and systems for creating a computerized model representing a layered shell-like structure are disclosed. 2-D reference mesh model and a user-specified definition of a layered shell-like structure are received in a computer system. The 2-D reference mesh model contains a plurality of reference nodes connected by a plurality of 2-D reference elements for representing the layered shell-like structure's mid-plane in the 2-D reference mesh model's thickness direction and the user-specified definition includes the number of layers and each layer's characteristics. A set of new nodal locations along respective reference nodes' normal vectors are calculated according to a set of rules derived from the user-specified definition. New nodes for defining a computerized model that represents the layered shell-like structure are created by reproducing the reference nodes at each corresponding new nodal location. And corresponding finite elements of the computerized model at respective layers are formed according to the user-specified definition.

15 Claims, 8 Drawing Sheets

(56) References Cited

U.S. PATENT DOCUMENTS

| | | | |
|---|---|---|---|
| 2011/0098987 A1* | 4/2011 | Isoshima | G06F 17/5018 |
| | | | 703/1 |
| 2011/0106507 A1* | 5/2011 | Lepage | G01V 11/00 |
| | | | 703/2 |
| 2014/0257765 A1* | 9/2014 | Zhang | G06F 17/5009 |
| | | | 703/2 |

OTHER PUBLICATIONS

Han et al. Hexahedral Shell Mesh Construction via Volumetric Polycube Map ACM Symposium of Solid and Physical Modeling, 2010, pp. 127-136.*

Davila Solid-To-Shell Transition Elements for the Computation of Interlaminar Stresses Computing Systems in engineering vol. 5, No. 2, pp. 193-202, 1994.*

Roca et al. An Automatic and General Least-Square Projection Procedure for Sweeping Meshing Engineering with Computers, 26, 2010, pp. 391-406.*

Soutis et al. Modelling the Structural Response of GLARE panels to Blast Load Composite Strutures 94, 2011, pp. 267-276.*

Zinno et al. A Three-Dimensional Layer-Wise Constant Shear Element for General Anisotropic Shell-Type Structures International Journal for Numerical Methods in Engineering, vol. 37, 1994, pp. 2445-2470.*

Carrera Theories and Finite Elements for Multilayered, Anisotropic, Composite Plates and Shells Arch. Comput. Meth. Engng vol. 9, 2, pp. 87-140, 2002.*

Hauptmann et al. A Systematic Development of 'Solid-Shell' Element Formulations for Linear and Non-Linear Analyses Employing Only Displament Degrees of Freedom International Jounal for Numerical Methods in Engineering, 42, pp. 49-69, 1998.*

A. Benjeddou Advances in Piezoelectric Finite Element Modeling of Adaptive Structural Elements: A Survey Computers and Structures 76, 2000, pp. 347-363.*

Carlos Davila Effective Simulation of Delamination in Aeronautical Structures Using Shells and Cohesive Elements Journal of Aircraft vol. 45, No. 2, Mar.-Apr. 2008, pp. 663-674.*

Li et al. A New Interface Element for Shell Structures Delamination Analysis 13th International Conference on Fracture, Jun. 2013, pp. 1-6.*

Davila et al. Cohesive Elements for Shells NASA/TP-2007-214869, Apr. 2007, pp. 1-22.*

* cited by examiner

METHODS AND SYSTEMS FOR CREATING COMPUTERIZED MESH MODEL FOR LAYERED SHELL-LIKE STRUCTURE

FIELD

The present invention generally relates to computer-aided engineering analysis, more particularly to computerized mesh model creation methods for layered shell-like structure and systems thereof.

BACKGROUND

Layered shell-like structure such as layered composite materials have been used in many applications in engineering products from a patio to an airplane. One of the characteristics of layered or stacked shell-like structure is that the material properties vary from one layer to another layer in the thickness direction. An example layered shell-like structure is a sandwich plate system 200 shown in FIG. 2. It is noted that the thickness of a layered shell-like structure is generally small comparing to dimensions of the in-plane directions.

Computer aided engineering (CAE) analysis has been used for helping engineers and scientists to design products including products having layered shell-like structure. Example CAE includes finite element analysis (FEA), boundary element analysis (BEA), etc. One of the requirements for using CAE is to represent the product with a computerized mesh model. Prior art approaches to create such a computerized mesh model with different element types and/or material properties over the thickness have been tedious and/or ad hoc. For example, an interactive graphical pre-processor is required for users to manipulate the computerized mesh model. Therefore, it would be desirable to have an improved method for creating computerized mesh model for layered shell-like structure.

BRIEF SUMMARY

This section is for the purpose of summarizing some aspects of the present invention and to briefly introduce some preferred embodiments. Simplifications or omissions in this section as well as the abstract and the title herein may be made to avoid obscuring the purpose of the section. Such simplifications or omissions are not intended to limit the scope of the present invention.

Methods and systems for creating a computerized model representing a layered shell-like structure are disclosed. According to one aspect, a two-dimensional (2-D) reference mesh model and a user-specified definition of a layered shell-like structure are received in a computer system having a computer aided engineering (CAE) analysis application module installed thereon. The 2-D reference mesh model contains a plurality of reference nodes connected by a plurality of 2-D reference elements for representing the layered shell-like structure's mid-plane in the 2-D reference mesh model's thickness direction and the user-specified definition includes the number of layers and each layer's characteristics. A set of new nodal locations along respective reference nodes' normal vectors are calculated according to a set of rules derived from the user-specified definition. New nodes for defining a computerized model that represents the layered shell-like structure are created by reproducing the reference nodes at each corresponding new nodal location. And corresponding finite elements of the computerized model at respective layers are formed in accordance with the user-specified definition.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Additionally, used herein, the terms "upper", "lower", "top" and "bottom" are intended to provide relative positions for the purposes of description, and are not intended to designate an absolute frame of reference. Further, the order of blocks in process flowcharts or diagrams representing one or more embodiments of the invention do not inherently indicate any particular order nor imply any limitations in the invention.

Embodiments of the present invention are discussed herein with reference to FIGS. 1-11. However, those skilled in the art will readily appreciate that the detailed description given herein with respect to these figures is for explanatory purposes as the invention extends beyond these limited embodiments.

Figure 1:
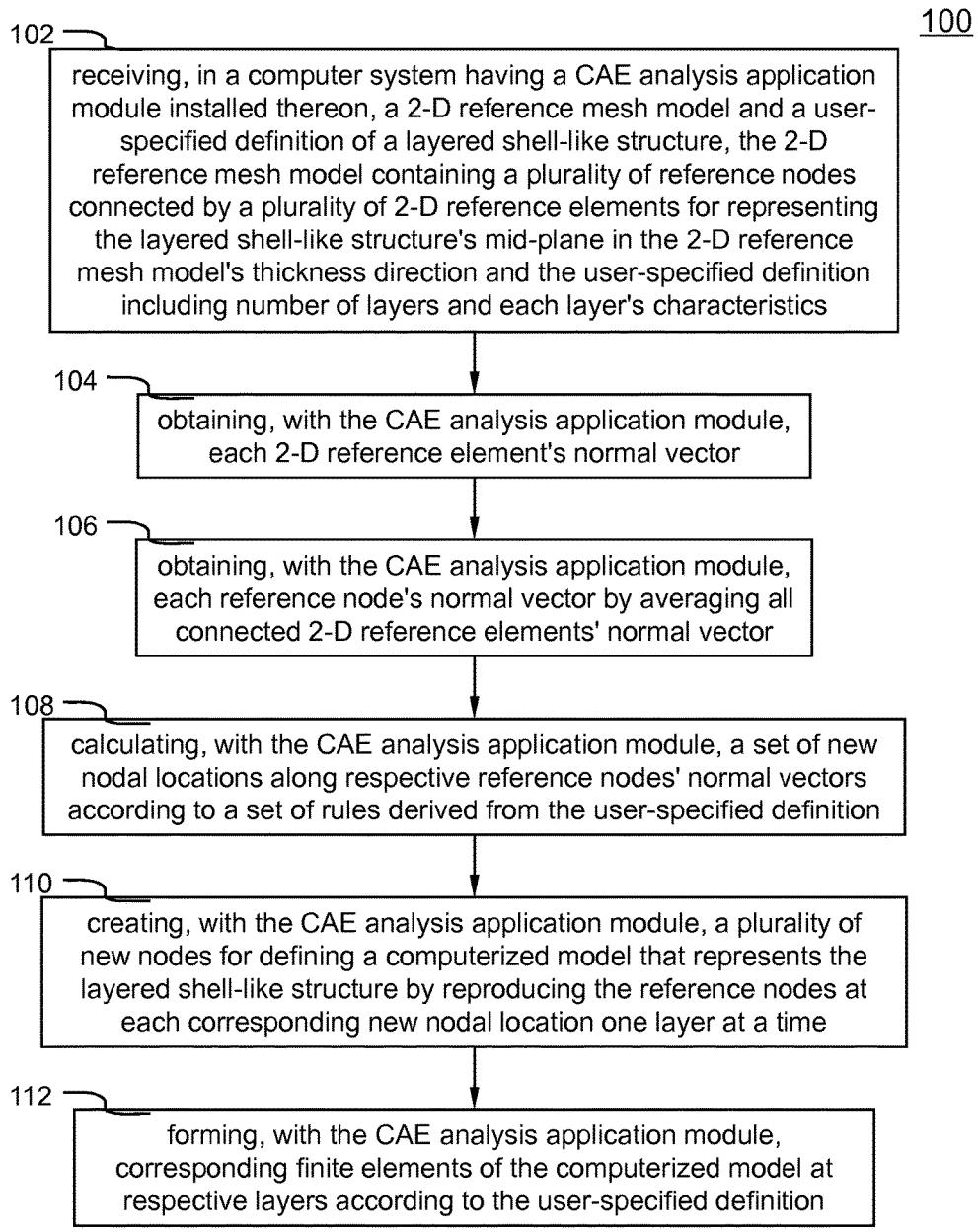
FIG. 1 is a flowchart illustrating an example process executed in a computer system for creating a computerized model representing a layered shell-like structure, according to an embodiment of the present invention.
Figure 2:
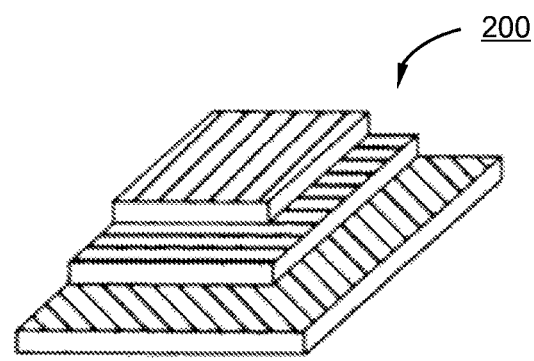
FIG. 2 is a perspective view showing an example layered shell-like structure, which may be represented by a computerized model in accordance with one embodiment of the present invention.
Figure 3:
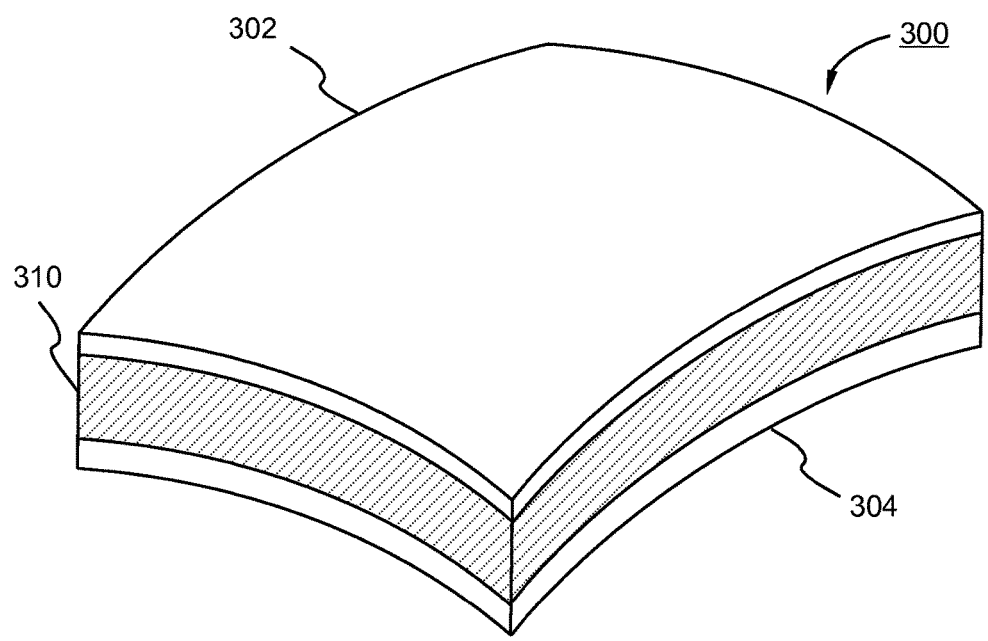
FIG. 3 is a perspective view showing an example layered shell-like structure having two shell finite element layers with one solid finite element layer therebetween, according to an embodiment of the present invention.
Figure 4:
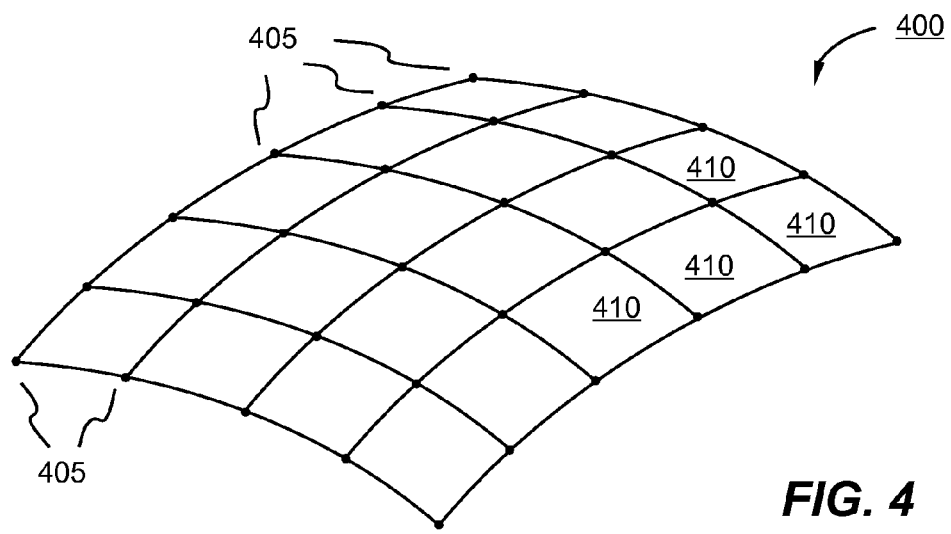
FIG. 4 is a perspective view showing an example reference mesh model in accordance with one embodiment of the present invention.

Referring first to FIG. 1, it is shown a flowchart illustrating an example process 100 of creating a computerized model for a layered shell-like structure in accordance with one embodiment of the present invention. Process 100 is preferably implemented in software and understood with other figures. FIG. 2 shows an example layered shell-like structure 200, for example, a laminated plate having three layers. The layered shell-like structure can also be referred to as stacked shell-like structure, for example, FIG. 3 shows such an example. The example stacked or layered shell-like structure 300 contains thin layers 302-304 at top and bottom (represented or modeled with shell finite elements) and thicker layer 310 in between (represented or modeled with solid finite elements).

According to one embodiment, computerized model of a layered shell-like structure cannot contain two consecutive shell finite element layers. In other words, two shell finite element layers must be separated by at least one solid finite element layer in a computerized model according to one embodiment of the present invention.

Process 100 starts at action 102 by receiving a two-dimensional (2-D) reference mesh model and a user-specified definition of the layered shell-like structure in a computer system (e.g., computer system 1100 of FIG. 11) having a computer aided engineering (CAE) analysis application module installed thereon. The 2-D reference mesh model represents the layered shell-like structure's mid-plane. An example 2-D reference model 400 shown in FIG. 4 contains a number of reference nodes 405 connected by a number of 2-D reference elements 410. The user-specified definition includes the number of layers and each layer's characteristics. The characteristics include each layer's identification (ID), each layer's element type (shell or solid finite elements), each layer's thickness and each layer's material properties. Additionally, if the element type is solid finite element, the number of elements in the thickness direction is also defined/specified.

Figure 5:
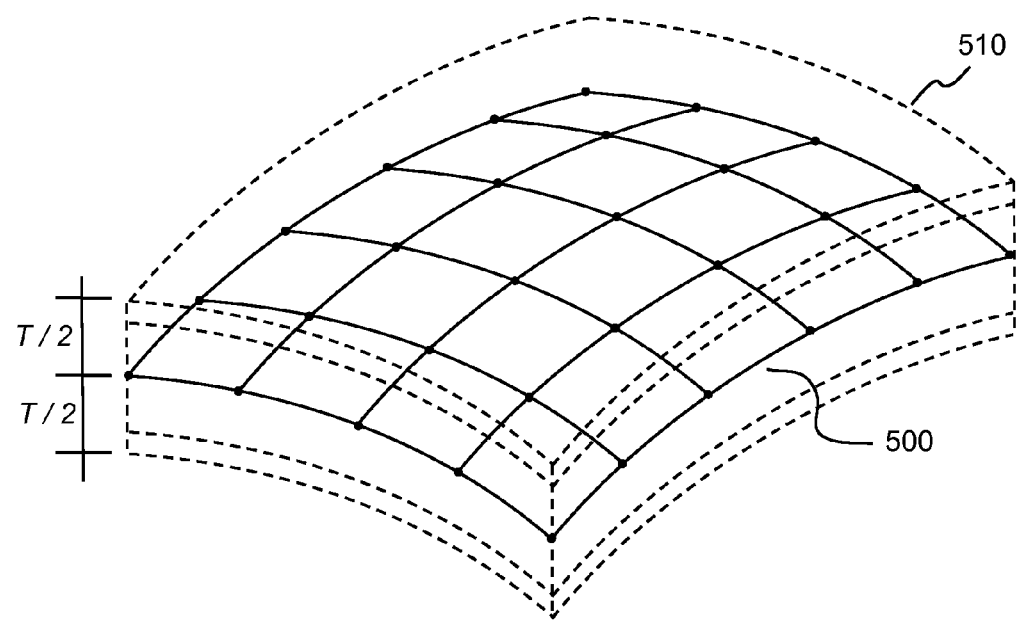
FIG. 5 is a perspective view showing an example computerized model of the example layered shell-like structure of FIG. 3 in accordance with one embodiment of the present invention.

FIG. 5 shows an example computerized model 510 (represented by dotted lines) created from an example 2-D reference mesh model 500 (represented by solid lines and dots), which is located at the mid-plane in the thickness direction of the layered shell-like structure. The total thickness T is the sum of all layer's thickness as follows:

$$T = \sum_{i=1}^{n} t_i$$

where n is the total number of layers and $t_i$ is the thickness of the i-th layer.

Figure 6:
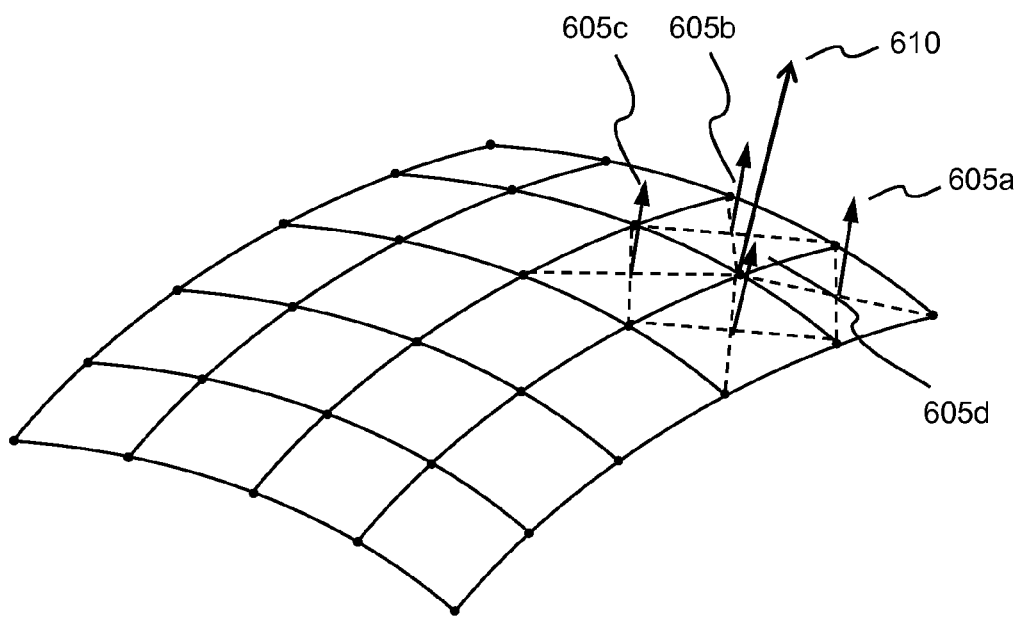
FIG. 6 is a perspective view showing an example reference node's normal vector and connected 2-D reference elements' normal vectors in accordance with one embodiment of the present invention.

Next, at action 104, the element normal vector of each of the 2-D reference elements of the 2-D reference mesh model is obtained. There are many well-known methods to obtain such a normal vector, for example, using cross product of two diagonal vectors (dotted lines in FIG. 6) of a quadrilateral element. Then, at action 106, each reference node's normal vector is obtained by averaging all connected elements' normal vectors. FIG. 6 shows an example scheme of obtaining reference node's normal vector 610 with all connected reference elements' normal vectors 605a-d.

A shell finite element is described by its mid-plane nodal coordinates and a thickness value. The actual physical top and bottom surfaces are derived from that, but no real nodes are present there. On the other hand, solid finite element nodes genuinely describe the real geometry of the discretized body, i.e. corresponding nodes actually lie on the surface. This difference leads to the fact that the combination of shell and solid elements in thickness direction of a lamina system needs a specific strategy. According to one embodiment, two consecutive layers always share the same nodes in between them, i.e. all layers are firmly connected. This condition and the previously described difference between shell and solid finite elements leads to the necessity that shell and solid finite elements partly overlap if they follow each other in the stacking sequence.

New nodes and associated finite elements of a computerized model are created with layer-wise generation scheme. New nodes of each layer are just a copy of the reference nodes shifted in the thickness direction. Therefore, the distance or new nodal location between the mid-plane and local directional vector orthogonal to the mid-plane (i.e., the plane represented by the reference mesh model) needs to be calculated.

At action 108, a set of new nodal locations along the respective reference nodes' normal vectors are calculated according to a set of rules derived from the user-specified definition. The rules are as follows:
   a) for each shell finite element layer, one nodal location is required to represent the mid-plane of the layer; and
   b) for each solid finite element layer, two nodal locations are required to represent lower and upper sides of the solid finite element layer.

To determine the nodal locations, the following formulas are used for solid finite element layer i:
   1) when solid finite element layer i is followed by another solid finite element layer or nothing (last layer), $$z_i^{upper} = z_i + t_i/2$$

2) when solid finite element layer i is followed by shell element layer i+1, $$z_i^{upper} = z_i + t_i/2 + t_{i+1}/2$$

3) when solid finite element layer i is preceded by another solid finite element layer or nothing (first layer), $$z_i^{lower} = z_i - t_i/2$$

4) when solid finite element layer i is preceded by shell element layer i−1, $$z_i^{lower} = z_i - t_i/2 - t_{i-1}/2$$

where $z_i$ is the coordinate of the mid-plane and $t_i$ is the thickness of the solid finite element layer i, and $t_{i+1}$ and $t_{i-1}$ are respective thickness of the adjacent shell finite element layers.

Figure 8:
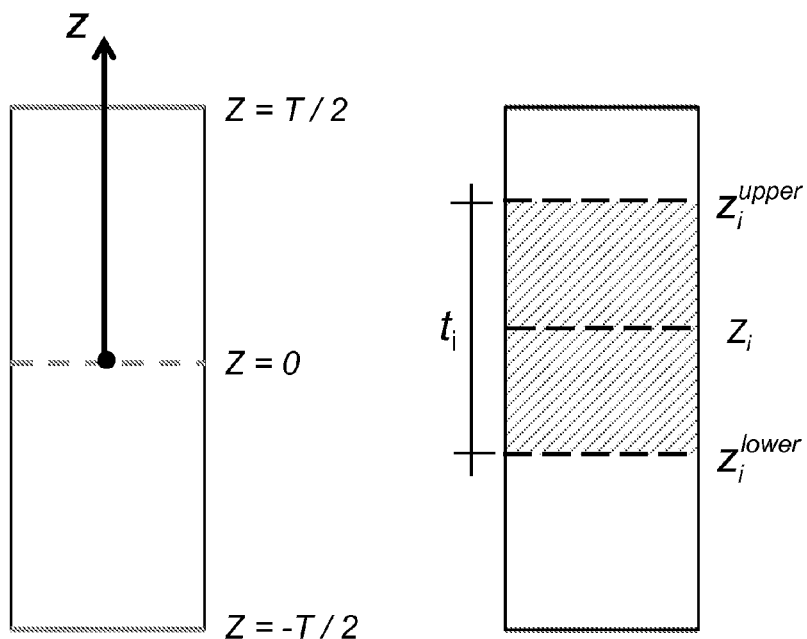
FIG. 8 is a schematic diagram showing an example nodal locations of a solid finite element layer calculated with a set of rules derived from user-specified definition of layered shell-like structure in accordance with one embodiment of the present invention.

To demonstrate the set of formulas for calculating nodal locations of a solid finite element layer, a schematic diagram is shown in FIG. 8.

Figure 7:
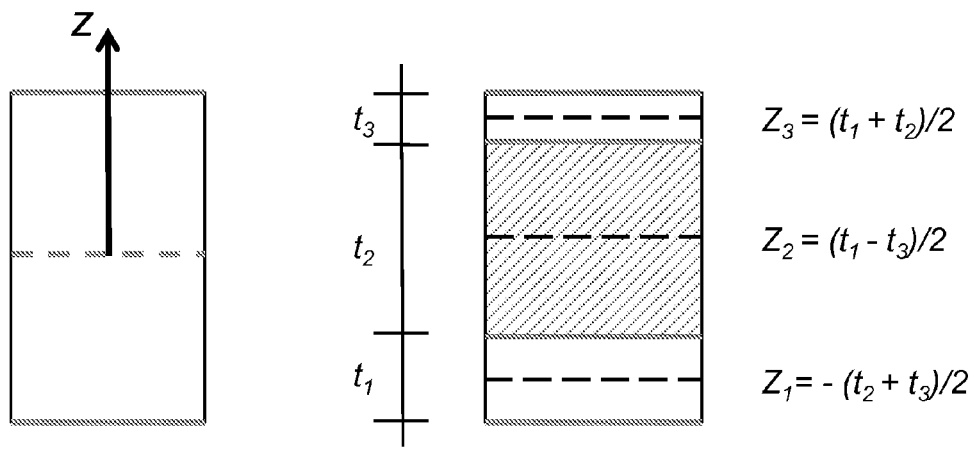
FIG. 7 is a schematic diagram showing an example new nodal locations of the shell finite element layers in accordance with one embodiment of the present invention.

FIG. 7 is a schematic diagram showing a computerized model having three layers (shell-solid-shell). A coordinate system Z with the origin at mid-plane of the entire structure (i.e., represented by reference mesh model). Coordinates of three mid-planes ($Z_1$, $Z_2$, $Z_3$) are calculated using the thicknesses of the three layers ($t_1$, $t_2$, $t_3$).

Referring back to process 100, next at action 110, new nodes for defining the computerized model that represents the layered shell-like structure are created by reproducing the reference nodes at each new nodal location in a layer-wise manner (i.e., copying the entire reference nodes one layer at a time).

Then, at action 112, corresponding finite elements are formed at respective layers in accordance with the user-specified definition.

Figure 9:
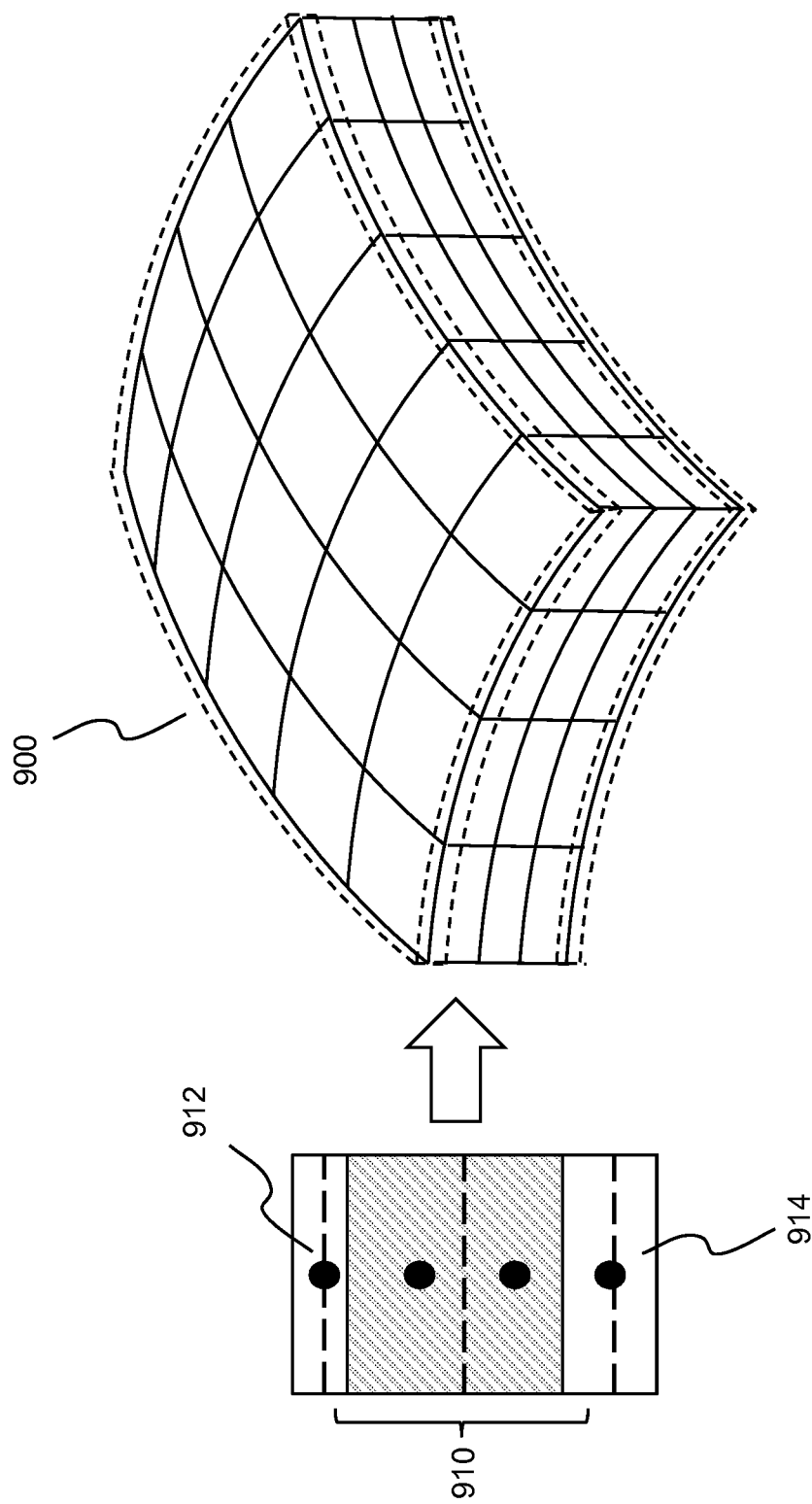
FIG. 9 is a diagram showing new nodal locations for creating a computerized model that represents layered shell-like structure in accordance with an embodiment of the present invention.

Generation of new nodes and corresponding finite elements starts from bottom layer and go through the total number of layers up to the top layer. New nodes of each shell finite element layer get their coordinates by multiplying the respective distance with the nodal normal vector. If more than one solid elements over thickness have to be created for one layer, the corresponding nodes are equally distributed over the height. New finite elements are generated adopting the in-plane connectivity logic in the 2-D reference mesh model. FIG. 9 shows a layered shell-like structure 900 contains two outer layers of shell finite elements and three solid finite elements in the inner layer. Four new nodal locations 910 need to be calculated. Top and bottom nodes 912-914 are shared by shell and solid finite elements. Finally, each layer is assigned with its own identifier (ID), material properties, and particular finite element type.

Figure 10:
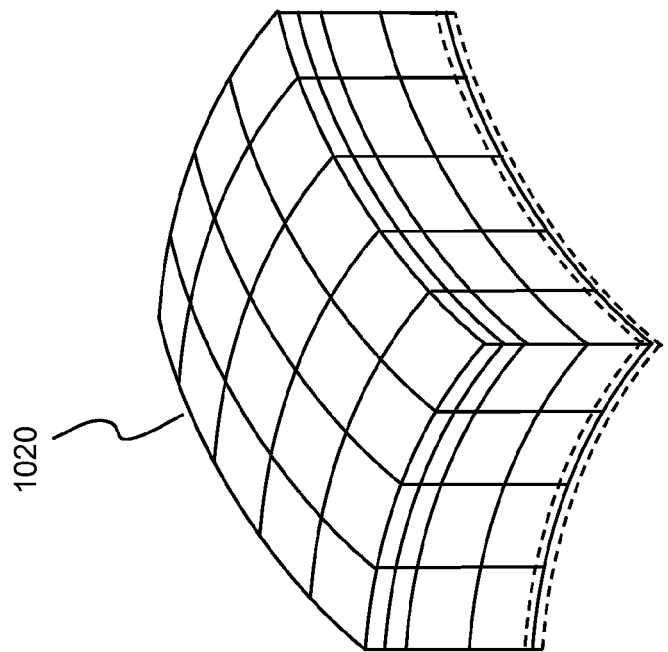
FIG. 10 is a perspective view showing two alternative example computerized models of a layered shell-like structure in accordance with an embodiment of the present invention.
Figure 10:
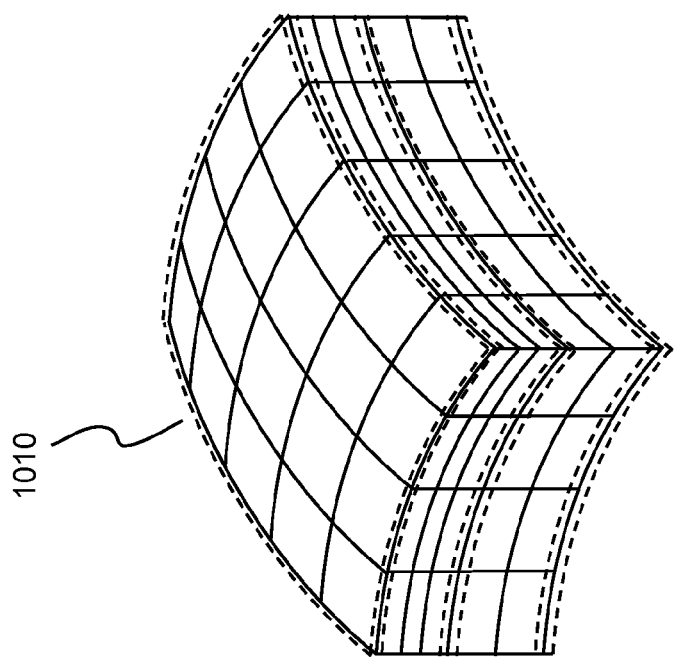

Using this technique, not only the computerized model can be generated automatically based on the user-specified definition, but also allow different finite element types (i.e., shell and solid finite elements) being stacked up on top of each other in an arbitrary manner. Two of such examples are shown in FIG. 10. The first example 1010 has a sequence from bottom to top: shell (dotted lines), two thick solids, shell (dotted lines), three thin solids and shell (dotted lines). The second example 1020 has shell (dotted lines), two thick solids and two thin solids.

Figure 11:
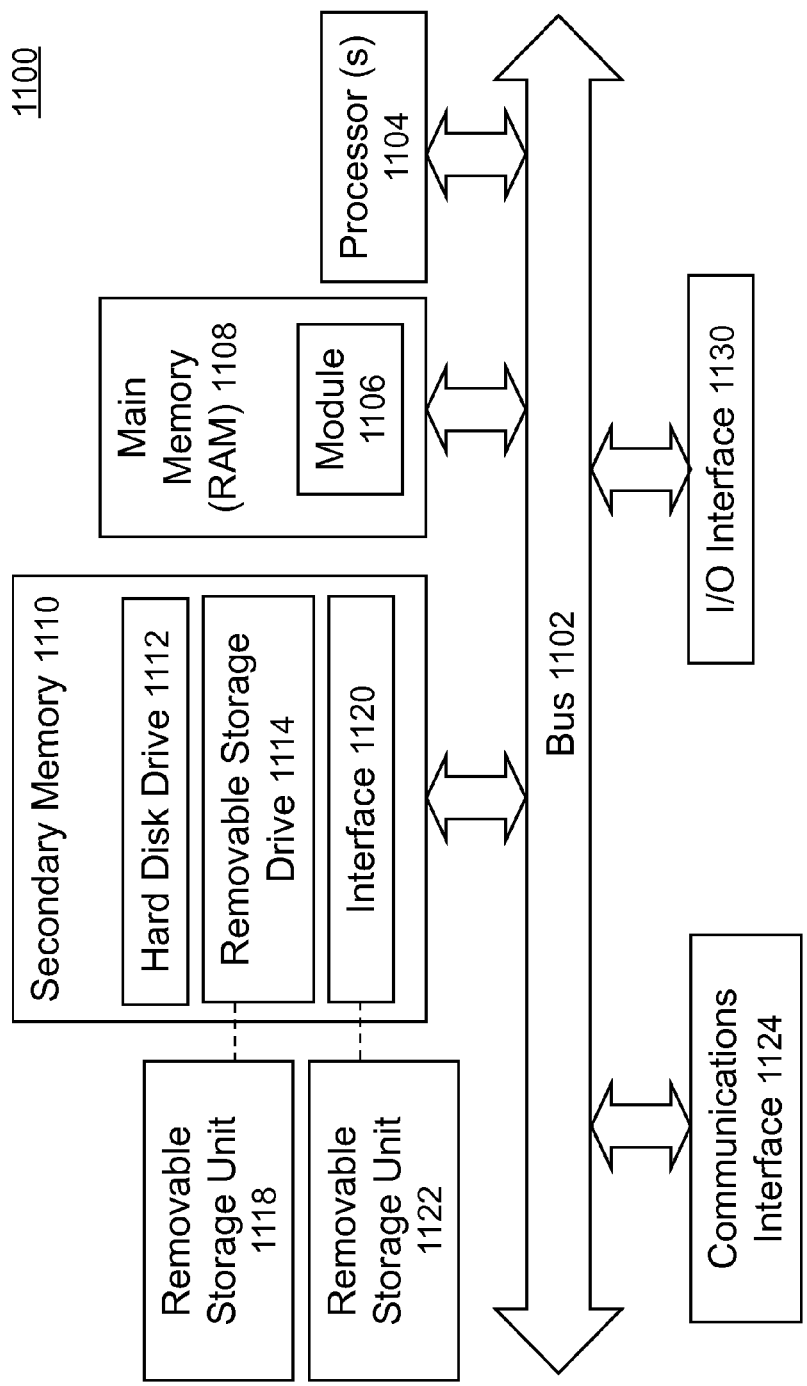
FIG. 11 is a function diagram showing salient components of a computing system, in which an embodiment of the present invention may be implemented.

According to one aspect, the present invention is directed towards one or more computer systems capable of carrying out the functionality described herein. An example of a computer system 1100 is shown in FIG. 11. The computer system 1100 includes one or more processors, such as processor 1104. The processor 1104 is connected to a computer system internal communication bus 1102. Various software embodiments are described in terms of this exemplary computer system. After reading this description, it will become apparent to a person skilled in the relevant art(s) how to implement the invention using other computer systems and/or computer architectures.

Computer system 1100 also includes a main memory 1108, preferably random access memory (RAM), and may also include a secondary memory 1110. The secondary memory 1110 may include, for example, one or more hard disk drives 1112 and/or one or more removable storage drives 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, etc. which is read by and written to by removable storage drive 1114. As will be appreciated, the removable storage unit 1118 includes a computer usable storage medium having stored therein computer software and/or data.

In alternative embodiments, secondary memory 1110 may include other similar means for allowing computer programs or other instructions to be loaded into computer system 1100. Such means may include, for example, a removable storage unit 1122 and an interface 1120. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 1122 and interfaces 1120 which allow software and data to be transferred from the removable storage unit 1122 to computer system 1100. In general, Computer system 1100 is controlled and coordinated by operating system (OS) software, which performs tasks such as process scheduling, memory management, networking and I/O services.

There may also be a communications interface 1124 connecting to the bus 1102. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. The computer 1100 communicates with other computing devices over a data network based on a special set of rules (i.e., a protocol). One of the common protocols is TCP/IP (Transmission Control Protocol/Internet Protocol) commonly used in the Internet. In general, the communication interface 1124 manages the assembling of a data file into smaller packets that are transmitted over the data network or reassembles received packets into the original data file. In addition, the communication interface 1124 handles the address part of each packet so that it gets to the right destination or intercepts packets destined for the computer 1100. In this document, the terms "computer program medium" and "computer usable medium" are used to generally refer to media such as removable storage drive 1114, and/or a hard disk installed in hard disk drive 1112. These computer program products are means for providing software to computer system 1100. The invention is directed to such computer program products.

The computer system 1100 may also include an input/output (I/O) interface 1130, which provides the computer system 1100 to access monitor, keyboard, mouse, printer, scanner, plotter, and alike.

Computer programs (also called computer control logic) are stored as application modules 1106 in main memory 1108 and/or secondary memory 1110. Computer programs may also be received via communications interface 1124. Such computer programs, when executed, enable the computer system 1100 to perform the features of the present invention as discussed herein. In particular, the computer programs, when executed, enable the processor 1104 to perform features of the present invention. Accordingly, such computer programs represent controllers of the computer system 1100.

In an embodiment where the invention is implemented using software, the software may be stored in a computer program product and loaded into computer system 1100 using removable storage drive 1114, hard drive 1112, or communications interface 1124. The application module 1106, when executed by the processor 1104, causes the processor 1104 to perform the functions of the invention as described herein.

The main memory 1108 may be loaded with one or more application modules 1106 that can be executed by one or more processors 1104 with or without a user input through the I/O interface 1130 to achieve desired tasks. In operation, when at least one processor 1104 executes one of the application modules 1106, the results are computed and stored in the secondary memory 1110 (i.e., hard disk drive 1112). The status of the finite element analysis (e.g., simulation of a structure having parts made of composite materials) is reported to the user via the I/O interface 1130 either in a text or in a graphical representation Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, the example reference mesh model has been described and shown with quadrilateral reference elements, other type of reference elements can accomplished the same, for example, triangular reference elements. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A method of creating a computerized model representing a layered shell-like structure as an input file of a computer aided engineering analysis, the method comprising:
    receiving, in a computer system having a computer aided engineering (CAE) analysis application module installed thereon, a two-dimensional (2-D) reference mesh model and a user-specified definition of a layered shell-like structure, the 2-D reference mesh model containing a plurality of reference nodes connected by a plurality of 2-D reference elements for representing the layered shell-like structure's mid-plane in the 2-D reference mesh model's thickness direction and the user-specified definition including number of layers and each layer's characteristics;
    obtaining, with the CAE analysis application module, each 2-D reference element's normal vector;
    obtaining, with the CAE analysis application module, each reference node's normal vector by averaging all connected 2-D reference elements' normal vector;
    calculating, with the CAE analysis application module, a set of new nodal locations along respective reference nodes' normal vectors according to a set of rules derived from the user-specified definition;
    creating, with the CAE analysis application module, a plurality of new nodes for defining a computerized model that represents the layered shell-like structure by reproducing the reference nodes at each corresponding new nodal location one layer at a time; and
    forming, with the CAE analysis application module, corresponding finite elements of the computerized model at respective layers in accordance with the user-specified definition; whereby the computerized model is used as an input file in a computer aided engineering analysis for assisting engineers/scientists to improve the layered shell-like structure; and wherein the set of rules comprises following formulas:
    when a solid finite element layer i is followed by another solid finite element layer or the solid finite element layer i is the last layer, $$z_i^{upper} = z_i + t_i/2$$

when the solid finite element layer i is followed by shell element layer i+1, $$z_i^{upper} = z_i + t_i/2 + t_{i+1}/2$$

when the solid finite element layer i is preceded by another solid finite element layer or the solid finite element layer i is first layer, $$z_i^{lower} = z_i - t_i/2$$

when the solid finite element layer i is preceded by shell element layer i−1, $$z_i^{lower} = z_i - t_i/2 - t_{i-1}/2$$

where $z_i$ is mod-plane coordinate of the solid finite element layer i, $t_i$ is thickness of the solid finite element layer i, $t_{i+1}$ is thickness of the shell finite element layer i+1, and $t_{i-1}$ is thickness of the shell finite element layer i−1.

2. The method of claim 1, wherein said each layer's characteristics include an identifier (ID), an element type, and thickness.

3. The method of claim 2, wherein said element type includes shell or solid finite element.

4. The method of claim 2, wherein said each layer's characteristics further include number of elements in the thickness direction when the element type is solid finite element.

5. The method of claim 1, wherein the layered shell-like structure comprises no two consecutive layers being shell finite elements.

6. A system for creating a computerized model representing a layered shell-like structure as an input file of a computer aided engineering analysis, the system comprising:
    a main memory for storing computer readable code for a computer aided engineering (CAE) analysis application module;
    at least one processor coupled to the main memory, said at least one processor executing the computer readable code in the main memory to cause the CAE analysis application module to perform operations by a method of:
    receiving a two-dimensional (2-D) reference mesh model and a user-specified definition of a layered shell-like structure, the 2-D reference mesh model containing a plurality of reference nodes connected by a plurality of 2-D reference elements for representing the layered shell-like structure's mid-plane in the 2-D reference mesh model's thickness direction and the user-specified definition including number of layers and each layer's characteristics;
    obtaining each 2-D reference element's normal vector;
    obtaining each reference node's normal vector by averaging all connected 2-D reference elements' normal vector;
    calculating a set of new nodal locations along respective reference nodes' normal vectors according to a set of rules derived from the user-specified definition;
    creating a plurality of new nodes for defining a computerized model that represents the layered shell-like structure by reproducing the reference nodes at each corresponding new nodal location one layer at a time; and forming corresponding finite elements of the computerized model at respective layers in accordance with the user-specified definition; whereby the computerized model is used as an input file in a computer aided engineering analysis for assisting engineers/scientists to improve the layered shell-like structure; and wherein the set of rules comprises following formulas:

when solid finite element layer i is followed by another solid finite element layer or the solid finite element layer i is last layer, $$z_i^{upper} = z_i + t_i/2$$

when the solid finite element layer i is followed by shell element layer i+1, $$z_i^{upper} = z_i + t_i/2 + t_{i+1}/2$$

when the solid finite element layer i is preceded by another solid finite element layer or the solid finite element layer i is first layer, $$z_i^{lower} = z_i - t_i/2$$

when the solid finite element layer i is preceded by shell element layer i−1, $$z_i^{lower} = z_i - t_i/2 - t_{i-1}/2$$

where $z_i$ is mod-plane coordinate of the solid finite element layer i, $t_i$ is thickness of the solid finite element layer i, $t_{i+1}$ is thickness of the shell finite element layer i+1, and $t_{i-1}$ is thickness of the shell finite element layer i−1.

7. The system of claim 6, wherein said each layer's characteristics include an identifier (ID), an element type, and thickness.

8. The system of claim 7, wherein said element type includes shell or solid finite element.

9. The system of claim 7, wherein said each layer's characteristics further include number of elements in the thickness direction when the element type is solid finite element.

10. The system of claim 6, wherein the layered shell-like structure comprises no two consecutive layers being shell finite elements.

11. A non-transitory computer-readable storage medium containing instructions for controlling a computer system for creating a computerized model representing a layered shell-like structure as an input file of a computer aided engineering analysis by a method comprising:

receiving, in a computer system having a computer aided engineering (CAE) analysis application module installed thereon, a two-dimensional (2-D) reference mesh model and a user-specified definition of a layered shell-like structure, the 2-D reference mesh model containing a plurality of reference nodes connected by a plurality of 2-D reference elements for representing the layered shell-like structure's mid-plane in the 2-D reference mesh model's thickness direction and the user-specified definition including number of layers and each layer's characteristics;

obtaining, with the CAE analysis application module, each 2-D reference element's normal vector;

obtaining, with the CAE analysis application module, each reference node's normal vector by averaging all connected 2-D reference elements' normal vector;

calculating, with the CAE analysis application module, a set of new nodal locations along respective reference nodes' normal vectors according to a set of rules derived from the user-specified definition;

creating, with the CAE analysis application module, a plurality of new nodes for defining a computerized model that represents the layered shell-like structure by reproducing the reference nodes at each corresponding new nodal location one layer at a time; and forming, with the CAE analysis application module, corresponding finite elements of the computerized model at respective layers in accordance with the user-specified definition; whereby the computerized model is used as an input file in a computer aided engineering analysis for assisting engineers/scientists to improve the layered shell-like structure; and wherein the set of rules comprises following formulas:

when solid finite element layer i is followed by another solid finite element layer or the solid finite element layer i is last layer, $$z_i^{upper} = z_i + t_i/2$$

when the solid finite element layer i is followed by shell element layer i+1, $$z_i^{upper} = z_i + t_i/2 + t_{i+1}/2$$

when the solid finite element layer i is preceded by another solid finite element layer or the solid finite element layer i is first layer, $$z_i^{lower} = z_i - t_i/2$$

when the solid finite element layer i is preceded by shell element layer i−1, $$z_i^{lower} = z_i - t_i/2 - t_{i-1}/2$$

where $Z_i$ is mod-plane coordinate of the solid finite element layer i, $t_i$ is thickness of the solid finite element layer i, $t_{i+1}$ is thickness of the shell finite element layer i+1, and $t_{i-1}$ is thickness of the shell finite element layer i−1.

12. The non-transitory computer-readable storage medium of claim 11, wherein said each layer's characteristics include an identifier (ID), an element type, and thickness.

13. The non-transitory computer-readable storage medium of claim 12, wherein said element type includes shell or solid finite element.

14. The non-transitory computer-readable storage medium of claim 12, wherein said each layer's characteristics further include number of elements in the thickness direction when the element type is solid finite element.

15. The non-transitory computer-readable storage medium of claim 12, wherein the layered shell-like structure comprises no two consecutive layers being shell finite elements.

* * * * *